April 3, 1956 J. E. JENNINGS ET AL 2,740,920

ELECTRONIC IMPLEMENT

Filed May 6, 1952 2 Sheets-Sheet 1

INVENTORS
JO EMMETT JENNINGS and
LEWIS B. STEWARD
BY Charles S. Evans
their ATTORNEY April 3, 1956 J. E. JENNINGS ET AL 2,740,920
ELECTRONIC IMPLEMENT
Filed May 6, 1952 2 Sheets-Sheet 2

INVENTORS
JO EMMETT JENNINGS
and LEWIS B. STEWARD
BY Charles S. Evans
their ATTORNEY United States Patent Office 2,740,920
Patented Apr. 3, 1956

2,740,920

ELECTRONIC IMPLEMENT

Jo Emmett Jennings and Lewis B. Steward, San Jose, Calif., assignors, by mesne assignments, to Jennings Radio Manufacturing Corporation, San Jose, Calif., a corporation of California Application May 6, 1952, Serial No. 286,392
8 Claims. (Cl. 315—58)

Figure 1:
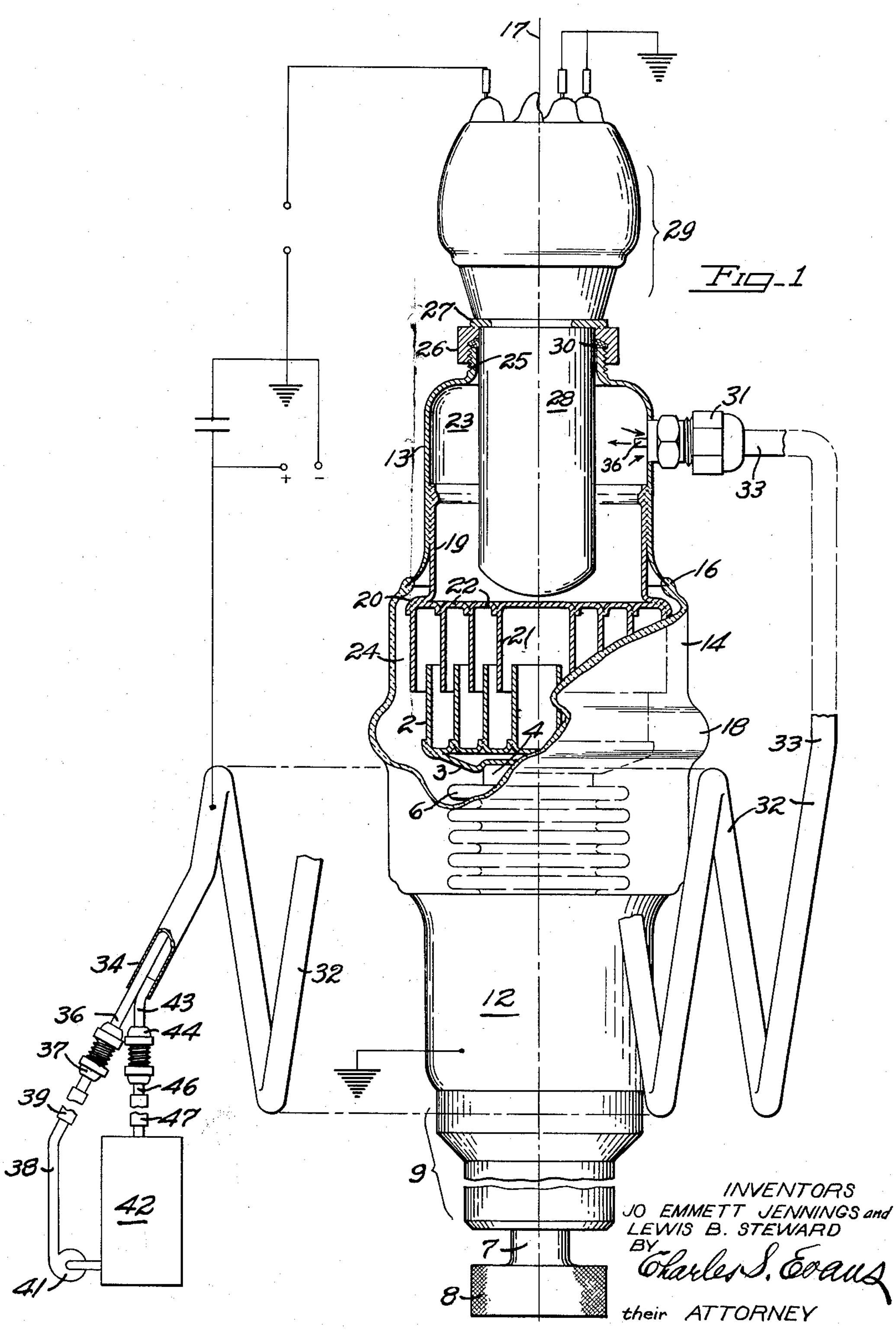

Our invention relates to electronic devices and the object of the invention generally is the provision of an electronic device in which an electronic vacuum tube, vacuum condenser, and inductance coil are combined in a single unit without impairment of the individual functions of the components, but with important gains in the elimination of external leads and connections with resultant drastic lessening of inductances and of parasitic and harmonic conditions.

Secondary objects of our invention include the provision of a structure in which the electronic tube component, which may be any type having an external plate assembly, is readily replaceable; a cooling system including a chamber contiguous to both electronic tube and capacitor mounting; and a coolant supply conduit which also functions as a plate inductance coil.

The invention possesses other objects, some of which with the foregoing will be brought out in the following description of the invention. We do not limit ourselves to the showing made by the said description and the drawings, since we may adopt variant forms of the invention within the scope of the appended claims.

Figures 2, 3:
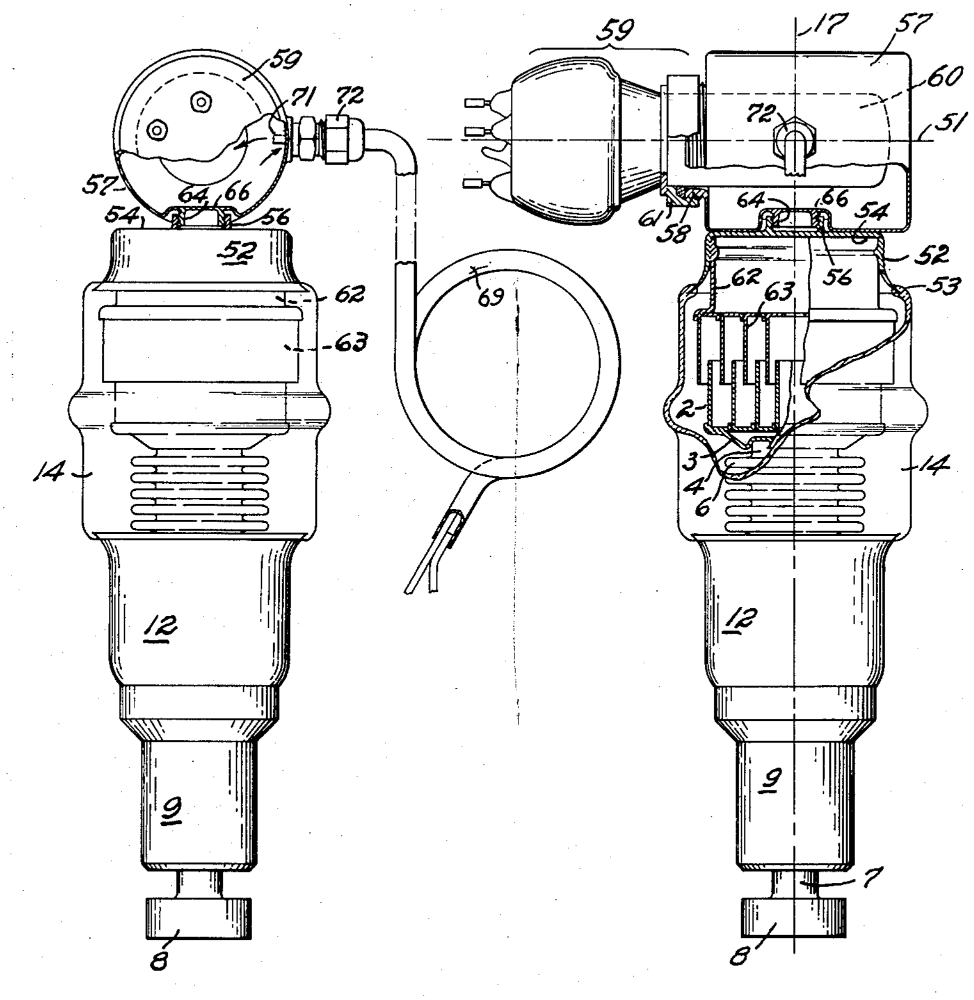

Referring to the drawings:

Fig. 1 is an elevation, partly in section, of one embodiment of our electronic implement. Connections for a conventional tuned grid, tuned plate oscillator or amplifier circuit, and also the heat exchanger connections are indicated in diagram. Figs. 2 and 3 are elevations each partly in section, of another embodiment of our invention, the two views being taken in planes at right angles to each other.

In electronic circuits every lead and connector is more or less of an inductance, and a cause of parasitic currents and harmonics. Therefore a lessening or elimination of lead inductance creates a more efficient circuit. With the elimination of all external leads, and the shortening of all connections between components thereby decreasing space dimensions, our device makes possible the effective use of a given capacity, a given inductance coil, and given tube characteristics, in much higher frequencies than has been possible with the separate components, thus overcoming a major difficulty in the approach to higher frequency problems. Our invention permits the combination into one unit or implement without connecting leads between them, of the three components of tube, capacitor and inductance coil, which heretofore have required connecting leads, each of which imposed its inherent and deleterious influence on the circuit and component parts.

With reference to electrical characteristics, increased efficiencies are marked in that stray capacities to ground have been reduced to a minimum, and lead inductance from tube to tank circuit is negligible at operating frequencies. Other characteristics are low corona losses, low inductance and high leakage resistance, high current carrying capacity, suppression of harmonic and parasitic currents, wider frequency range because of the elimination of losses, and a wider tuning range.

Referring now to the drawings, we have shown a vacuum variable condenser or capacitor generally of the same type as that shown in our copending application, Serial No. 257,392 filed November 20, 1951, although a fixed plate capacitor may also be used. In the stator end of the capacitor, a vacuum tube of external anode type is mounted in a chamber, the metal walls of which form a housing or jacket and are continuous with the stator or fixed end of the capacitor. A coiled copper tube is arranged to form a plate inductance coil for the vacuum tube and also provide a conduit to conduct fluid from the chamber. A smaller conduit inside the larger coil is connected to provide an inflow passage for the coolant.

The implements of Figs. 1 and 2 differ mechanically chiefly in the relationship of the two long axes of capacitor and vacuum tube. In Fig. 1, the axes are aligned. In Fig. 2 the axes are crossed; and preferably intersect and at an angle of 90° to each other. Electrically, the difference between the two structures is one of improved efficiency, because of shorter leads in the implement of Fig. 2.

In detail and referring first to Fig. 1, our implement includes a capacitor or condenser similar in many of its features to the condenser shown and described in our above mentioned copending application; and including the movable cylindrical plates 2, concentrically and fixedly mounted on the junction cone or ring 3, carried on the closed end 4 of the bellows 6. The bellows is operated by the spindle 7, ending exteriorly in the knurled knob 8. The spindle is journaled in a bearing within the hood 9, by which the implement may be mounted, preferably in vertical position, in a suitable bracket (not shown).

The hood bears against the cylindrical metallic end cap 12, forming the lower part of the vacuumized envelope of the condenser. The cylindrical metallic end cap 13 forms the upper part. These end caps 12 and 13 are sealed into the lower and upper rims respectively of the glass mid portion 14 of the envelope by the usual metal-to-glass seal 16; and all parts are concentrically arranged about the long axis 17 of the implement.

The two parts of the glass envelope, each with its assembled parts of the condenser, are jointed together in conventional fashion at the bulge 18. In the lower part of the envelope, including part of the glass and the end cap 12, the movable plates 2 and their operating mechanism are assembled; and in the upper part, the fixed plates, vacuum tube mounting and cooling chamber are arranged.

The upper end cap 13 of the envelope is provided with a cylindrical junction ring 19, brazed to the inside of the cap, and extending into the glass portion 14 of the envelope. The lower end of the ring is flared to provide a flanged seat 20 for the concentric assembly of brazed cylindrical shells 21, which constitute the fixed or stator end of the condenser. The connected base flanges 22 of the plates form a tight closure across the flared end of the mounting shell so that the chamber 23 formed within the end cap 13 is without connection to the vacuumized chamber 24, surrounding the condenser plates.

The upper end of the cap 13 is formed with a heavy upturned annular flange 25, threaded on the outside to receive the locking collar 26, tightly fitting against and soldered to the flange 27, which is an extension or part of the plate 28 of the vacuum tube 29. The long axis of the tube is substantially coincident with the capacitor axis 17 and the plate extends down into the chamber 23 almost to the bottom of it, so that it is immersed in the coolant filling the chamber. A rubber gasket ring 30 at the top of the threaded flange makes the joint between vacuum tube and cap flange tight, but permits rapid removal and change of the vacuum tube. The end cap 13 thus provides a coolant jacket or housing in which the external anode 28 of the vacuum tube may be releasably held, the bottom of the jacket being the base, from the opposite face of which, the fixed plates of the condenser extend.

It will be observed that the structure just explained provides an ample metallic conductor for heat generated in the stator end of the condenser to flow outwardly to broad radiating surfaces in the open air. Heat from the anode 28 may also flow to these radiating surfaces through the direct metallic contact between the anode, collar 26 and the cap flange 25. Additional means are provided for cooling both condenser and vacuum tube parts. Connected into the end cap 13 by a readily applied and released compression coupling 31 is a copper tube or conduit including a helical coil 32. The lead end 33 of the coil, ending in the coupling, is as short as possible. The coil 32 is shown below its actual position to avoid overlapping of parts. In order to conduct water from the chamber 23 to the heat exchanger 42, the free end 34 of the conduit opens into a small pipe 43 extending a short distance into the conduit at one end and connected at the other end by compression coupling 44, pipe 46 and rubber hose 47 to the heat exchanger. With distilled water as the coolant fluid, the coil-conduit is thus insulated from the heat exchanger.

Water from the heat exchanger 42 flows to the chamber 23 through a feed pipe 36 lying within the larger conduit and extending a short distance into the chamber 23 at one end and at the other end releasably secured by compression coupling 37 to the supply line 38, formed in part by a rubber hose section 39, and connecting the feed pipe through the pump 41 with the heat exchanger 42. These parts which are conventional are shown in diagram at reduced scale at the lower left of Fig. 1.

Thus the copper coil 32 with a direct mechanical and electrical connection to the end cap 13 which in turn forms a direct mechanical and electrical connection to the plate 28 of the vacuum tube, constitutes a plate inductance without connecting leads, as well as a physical conduit for the coolant into and out of the cooling chamber 23. In addition, the coil itself radiates heat generated or taken up from whatever source. The coil 32 which is readily disconnected and replaced is of course selected with characteristics fitting it for operation with the particular vacuum tube and the condenser in the desired performance.

In designing a proper inductance-capacitance, it is essential that a proper balance between the two be used. If the inductance be small, the capacity should be small also. It is preferred to make the inductance coil in the form of a helix; and a length twice the diameter of the coil is satisfactory. For example, if a frequency of 5 magacycles is desired, a coil of fifteen turns of ¼″ copper tubing, the coil 3″ in diameter and 6″ long, may be used with about 200 micromicrofarads of capacity.

Although we have shown our implement connected into a simple oscillator or amplifier circuit, it is understood that it has a wide application in other circuits, and with other types of external anode vacuum tubes.

In Figs. 2 and 3 we have shown two elevations of a modified form of our invention capable of somewhat better performance and higher efficiency than the form just explained. There are two major mechanical differences between the two structures. One lies in the axial relationship between the axes of the capacitor and of the vacuum tube. In the construction of Fig. 1, the long axes of both capacitor and vacuum tube are coincident, while in the construction shown in Fig. 2, the axis 51 of the vacuum tube is at right angles to the axis 17 of the capacitor. This mechanical difference permits some connections to be shorted with corresponding lower inductance and enhancement of other desirable characteristics earlier referred to. The second major mechanical difference lies in the demountable anode housing of Fig. 2, and the integral anode housing of Fig. 1. This obviously widens the field of usefulness of the Fig. 2 structure.

This shifting of the vacuum tube axis makes possible a desirable shortening of the end cap 52, the cylindrical wall of which need be only long enough to provide for the usual metal-to-glass seal 53. The end cap extends across the top of the capacitor in the end plate 54, and an interiorly threaded socket ring 56 is centrally brazed on the end plate to serve as a mounting for the cylindrical housing or shell 57, forming a coolant jacket. In the flanged end 58 of the jacket, the vacuum tube 59, having the external anode 60, is releasably held by the threaded collar 61. Thus the coolant jacket forms a direct metal-to-metal contact, with the end cap 52 of the capacitor and the integrally united junction ring 62 in which the fixed plates 63 are brazed. The mounting of the external anode vacuum tube in the flange of the water jacket is the same as that already described in connection with Fig. 1, except for the difference in axial relationship.

The socket ring 56 acts to stiffen the end plate 54 against atmospheric pressure, but its main function is to engage an externally threaded stud ring 64, brazed into the bottom 66 of a shallow recess formed in the side of the coolant jacket. There is thus provided a simple means for releasably mounting the tube and jacket component on the condenser as well as releasably mounting the vacuum tube in the jacket, so that a wide range of component parts can be assembled as required for the particular job to be done.

The junction ring 62 of Fig. 2, brazed in the end cap 52, is the same as the ring 19 of Fig. 1, except that it is shorter and extends to the end plate 54. The rest of the capacitor structure shown in Figs. 2 and 3 is the same as that already explained in connection with Fig. 1.

Means for introducing a coolant fluid into and removing it from the housing or jacket 57 surrounding the anode 60 by means of a coiled tube, which at the same time functions as a plate induction coil, are the same as already explained in connection with Fig. 1. The outer tube 69 of copper conducts the coolant fluid from the jacket; and the inner tube 71 carries it from the heat exchanger to the jacket.

An easily released compression coupling 72 connects the conduit 69 into the side of the jacket; and this, with compression couplings at the opposite end similar to the coupling 44 in Fig. 1, provide means for quickly changing the inductance conduit component.

Thus we have provided in one compact implement as shown in both embodiments of our invention, a vacuum tube of external anode type, a low inductance condenser and a low inductance to the vacuum tube, using the stator or fixed end of the condenser to mount the vacuum tube, and using the inductance coil as a conduit for coolant fluid for self cooling and for the flow of coolant fluid to and from intimate contact with condenser plates and vacuum tube anode.

We claim:

1. An electronic implement comprising a vacuum capacitor having an end wall, a coolant jacket closed on one end by the end wall of the capacitor, an electronic vacuum tube mounted on the coolant jacket and having an external anode extending into the jacket, an inductance coil for the anode and connected to the jacket and to the anode, said inductance coil having a passage therethrough and opening into the jacket for the circulation of coolant fluid through said coil and jacket in thermal contact with said anode and said end wall.

2. An electronic implement comprising a vacuum capacitor having a conductive end cap including a wall dividing the capacitor into a vacuumized chamber and a closed cooling chamber, a plurality of metallic condenser plates fixed on said wall in the vacuumized chamber, an electronic vacuum tube having an external anode, means mounting the vacuum tube on the end cap with the anode within the cooling chamber and forming a direct mechanical and electrical connection between the anode and the end cap, said end cap having an inlet for admitting a coolant to said cooling chamber.

3. An electronic implement comprising an envelope having a vacuumized chamber and an unvacuumized chamber, condenser plates in the vacuumized chamber, an end wall mounting part of the condenser plates and forming a hermetic partition between the two chambers, an electronic vacuum tube mounted on the envelope and having an external anode extending into the unvacuumized chamber, and a conduit connected to the unvacuumized chamber for circulating coolant through the unvacuumized chamber in thermal contact with said wall and said anode.

4. An electronic implement comprising a vacuum capacitor having an envelope including a conducting portion integrally united to and supporting a plurality of condenser plates, an electronic vacuum tube having an external anode, an inductance coil for the anode, a conductive housing forming part of the envelope and mounting said vacuum tube on the capacitor and effecting a direct mechanical and electrical connection between the conducting portion and the anode, said housing constituting a coolant jacket for the external anode, means mounting the coil on the capacitor and effecting a direct mechanical and electrical connection between the conducting portion and the coil, said inductance coil having a passage therethrough and opening into the jacket for circulation of coolant fluid through the coil and jacket in heat transfer relation with said conductive portion and the anode.

5. An electronic implement comprising a vacuum capacitor having an end cap, an electronic vacuum tube having an external anode, an inductance coil for the anode, a coolant jacket surrounding the anode, means detachably mounting the vacuum tube and the coil on said jacket with the anode and coil in mechanical and electrical contact therewith and with the external anode extending within the jacket, said capacitor including a series of fixed plates mounted on said end cap, and said coil having a passage therethrough for circulating a coolant through the jacket to cool said end cap, said plates and said anode.

6. An electronic implement comprising a vacuum capacitor, an electronic vacuum tube having an external anode, an inductance coil, a coolant jacket mounted on said end wall, means mounting said tube on the jacket with said anode extending within the jacket, means mounting said coil on the jacket, the inductance coil having a passage therethrough and opening into the coolant jacket to cool said coil, said plates and said anode, said capacitor including a series of fixed plates mounted on said end wall, and means connected to said coil for circulating coolant through the coil and jacket.

7. An electronic implement comprising a vacuum capacitor having a metallic end cap integrally united to and supporting the condenser plates, an electronic vacuum tube having an external anode, a metallic housing in which the vacuum tube is mounted and forming a mechanical and electrical connection with the anode, and threaded stud and socket means mounting the housing on the capacitor and effecting a mechanical and electrical connection between the anode and the condenser plates.

8. An electronic implement of the oscillator type comprising a vacuum capacitor having a conductive end wall, an electronic vacuum tube having a conductive external anode, an inductance coil, a coolant jacket mounted on said end wall, means mounting said tube on the jacket with said anode extending within the jacket and with direct rigid mechanical and electrical connection between the anode, the coil and the jacket whereby said rigid unitary mounting will reduce inductance in the electrical connection between the anode, the coil and the jacket, means mounting said coil on the jacket, the inductance coil having a passage therethrough for circulating coolant and opening into the coolant jacket, said capacitor including a series of fixed plates mounted on said end wall and means connected to said coil for circulating coolant through the coil and jacket to cool said coil, said plates and said anode.

References Cited in the file of this patent

UNITED STATES PATENTS

| | | |
|---|---|---|
| 1,857,029 | Moser | May 3, 1932 |
| 1,862,930 | Gebhard et al. | June 14, 1932 |
| 1,965,127 | Marshall | July 3, 1934 |
| 2,068,991 | Kolster | Jan. 26, 1937 |
| 2,361,487 | Marzoli et al. | Oct. 31, 1944 |
| 2,511,338 | Jennings | June 13, 1950 |
| 2,556,846 | Longacre | June 12, 1951 |